US008280556B2

(12) United States Patent
Besore et al.

(10) Patent No.: US 8,280,556 B2
(45) Date of Patent: *Oct. 2, 2012

(54) ENERGY MANAGEMENT OF HVAC SYSTEM

(75) Inventors: John K. Besore, Louisville, KY (US); Michael F. Finch, Louisville, KY (US); Timothy Dale Worthington, Louisville, KY (US); Daniel Ryan Capelle, Louisville, KY (US)

(73) Assignee: General Electric Company, Schenectady, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 12/644,556

(22) Filed: Dec. 22, 2009

(65) Prior Publication Data
US 2011/0153090 A1    Jun. 23, 2011

(51) Int. Cl.
| G05B 21/00 | (2006.01) |
| G05B 13/00 | (2006.01) |
| G05B 15/00 | (2006.01) |
| G01M 1/38 | (2006.01) |
| G05D 23/32 | (2006.01) |
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G01R 11/56 | (2006.01) |
| G01R 21/133 | (2006.01) |
| G06F 17/00 | (2006.01) |
| G01K 13/00 | (2006.01) |
| F25D 17/00 | (2006.01) |
| B60H 1/00 | (2006.01) |
| F24F 11/00 | (2006.01) |
| G05D 23/19 | (2006.01) |
| F25B 29/00 | (2006.01) |
| F28F 13/00 | (2006.01) |
| C12Q 1/68 | (2006.01) |
| H04Q 9/06 | (2006.01) |

(52) U.S. Cl. .......... 700/278; 700/296; 705/412; 62/129; 62/157; 62/181; 165/11.1; 165/238; 165/256; 165/257; 165/260; 165/268; 165/269; 236/46 C; 340/589

(58) Field of Classification Search .................. 700/275, 700/276, 278, 286, 295, 296; 62/132, 157, 62/159, 127, 129, 177, 178, 180, 181; 165/11.1, 165/200, 201, 236, 238, 239, 253, 254, 256, 165/257, 260, 265, 267–269; 705/400, 412; 236/46 R, 46 C; 340/584, 588, 589
See application file for complete search history.

(56) References Cited

U.S. PATENT DOCUMENTS
5,598,349 A * 1/1997 Elliason et al. ............... 700/295
(Continued)

FOREIGN PATENT DOCUMENTS
JP   2000018687 A * 1/2000
(Continued)

Primary Examiner — Crystal J Barnes-Bullock
(74) Attorney, Agent, or Firm — Global Patent Operation

(57) ABSTRACT

An HVAC system for conditioning air of an associated room includes one or more power consuming features/functions including at least one temperature controlling element for one of heating and cooling air. A controller is operatively connected to the one or more power consuming features/functions. The controller is configured to receive and process a signal indicative of a utility state. The controller operates the HVAC system in one of a plurality or operating modes, including at least a normal operating mode and an energy savings mode in response to the received signal. The controller is configured to at least one of selectively adjust and deactivate at least one of the one or more power consuming features/functions to reduce power consumption of the HVAC system in the energy savings mode.

20 Claims, 7 Drawing Sheets

U.S. PATENT DOCUMENTS

| | | | | |
|---|---|---|---|---|
| 5,684,463 A * | 11/1997 | Diercks et al. | ................ | 340/584 |
| 5,826,650 A * | 10/1998 | Keller et al. | .................. | 165/236 |
| 6,064,310 A * | 5/2000 | Busak et al. | .................. | 340/588 |
| 6,167,389 A * | 12/2000 | Davis et al. | .................... | 705/412 |
| 6,622,925 B2 * | 9/2003 | Carner et al. | ............... | 236/46 R |
| 6,860,431 B2 * | 3/2005 | Jayadev | ......................... | 236/47 |
| 6,936,798 B2 * | 8/2005 | Moreno | ........................ | 219/492 |
| 7,010,363 B2 | 3/2006 | Donnelly et al. | | |
| 7,079,967 B2 | 7/2006 | Rossi et al. | | |
| 7,204,093 B2 * | 4/2007 | Kwon et al. | ................... | 62/157 |
| 7,296,426 B2 * | 11/2007 | Butler et al. | ................... | 62/181 |
| 7,331,187 B2 * | 2/2008 | Kates | ............................ | 62/129 |
| 7,392,661 B2 * | 7/2008 | Alles | ............................... | 62/127 |
| 7,752,856 B2 * | 7/2010 | Senba et al. | ..................... | 62/157 |
| 7,949,615 B2 * | 5/2011 | Ehlers et al. | .................. | 705/412 |
| 8,008,603 B2 * | 8/2011 | MacKenzie | ................... | 219/490 |
| 2008/0315000 A1 | 12/2008 | Gorthala et al. | | |
| 2010/0070091 A1* | 3/2010 | Watson et al. | ................ | 700/278 |
| 2010/0082161 A1* | 4/2010 | Patch | ........................... | 700/276 |

FOREIGN PATENT DOCUMENTS

| | | | | |
|---|---|---|---|---|
| JP | | 2003106603 A | * | 4/2003 |
| JP | | 2009020824 A | * | 1/2009 |

* cited by examiner

ENERGY MANAGEMENT OF HVAC SYSTEM

BACKGROUND

The present disclosure relates to energy management, and more particularly to power consuming device control methods and electrical energy consumption systems. This disclosure finds particular application to energy management of HVAC systems, such as central air conditioning systems for a home or office building.

Many utilities are currently experiencing a shortage of electric generating capacity due to increasing consumer demand for electricity. Currently utilities generally charge a flat rate, but with increasing cost of fuel prices and high energy usage at certain parts of the day, utilities have to buy more energy to supply customers during peak demand. Consequently, utilities are charging higher rates during peak demand. If peak demand can be lowered, then a potential huge cost savings can be achieved and the peak load that the utility has to accommodate is lessened. In order to reduce high peak power demand, many utilities have instituted time of use metering and rates which include higher rates for energy usage during on-peak times and lower rates for energy usage during off-peak times. As a result, consumers are provided with an incentive to use electricity at off-peak times rather than on-peak times.

Presently, to take advantage of the lower cost of electricity during off-peak times, a consumer typically manually operates an HVAC system during the off-peak times. For example, during off-peak times the consumer can decrease the setpoint temperature of the HVAC system and during on-peak times the consumer can increase the setpoint temperature of the HVAC system and/or turn the HVAC system off. This is undesirable because the consumer may not always be present in the home to operate the system during off-peak hours. This is also undesirable because the consumer is required to manually track the current time to determine what hours are off-peak and on-peak.

One proposed third party solution is to provide an energy management system where a controller "switches" the actual energy supply to the HVAC system on and off. However, there is no active control beyond the mere on/off switching. There are also currently different methods used to determine when variable electricity-pricing schemes go into effect. Also, different electrical companies can use different methods of communicating periods of high electrical demand to their consumer, for example phone lines, schedules, and wireless signals sent by the electrical utility company. Other electrical utility companies simply have rate schedules for different times of day. Therefore, there is a need to provide an improved energy management system that can operate an HVAC system during off-peak hours in order to reduce consumer's electric bills and also to reduce the load on generating plants during on-peak hours.

BRIEF DESCRIPTION

According to one aspect, an HVAC system for conditioning air of an associated room comprises one or more power consuming features/functions including at least one temperature controlling element for one of heating and cooling air. A controller is operatively connected to the one or more power consuming features/functions. The controller is configured to receive and process a signal indicative of a utility state. The controller operates the HVAC system in one of a plurality or operating modes, including at least a normal operating mode and an energy savings mode in response to the received signal. The controller is configured to at least one of selectively adjust and deactivate at least one of the one or more power consuming features/functions to reduce power consumption of the HVAC system in the energy savings mode.

According to another aspect, a central air conditioning system control method comprises determining a state for an associated energy supplying utility. The utility state is indicative of at least a peak demand period or an off-peak demand period. The central air conditioning system operates in a normal mode during the off-peak demand period and in an energy savings mode during the peak demand period. Any number of one or more power consuming features/functions of the central air conditioning system are selectively adjusted and/or deactivated to reduce power consumption of the central air conditioning system in the energy savings mode, including adjusting a setpoint temperature to precipitate less refrigeration system on time in the energy savings mode. The normal mode is returned to after the peak demand period is over.

According to yet another aspect, a central air conditioning system comprises a refrigeration system including a compressor, a condenser and an evaporator in a refrigerant flow relationship. A controller is configured to receive and process an energy signal. The signal has a first state indicative of a utility peak demand period and a second state indicative of a utility off-peak demand period. The controller operates the central air conditioning system in one of an energy savings mode and a normal operating mode based on the received signal being in the first and second states respectively. The controller is configured to increase a setpoint temperature of the refrigeration system and adjust a duty cycle of the compressor to precipitate less compressor on time in the energy savings mode unless the controller determines that an unacceptable consequence may occur as a result such adjustments.

DETAILED DESCRIPTION

Figure 1:
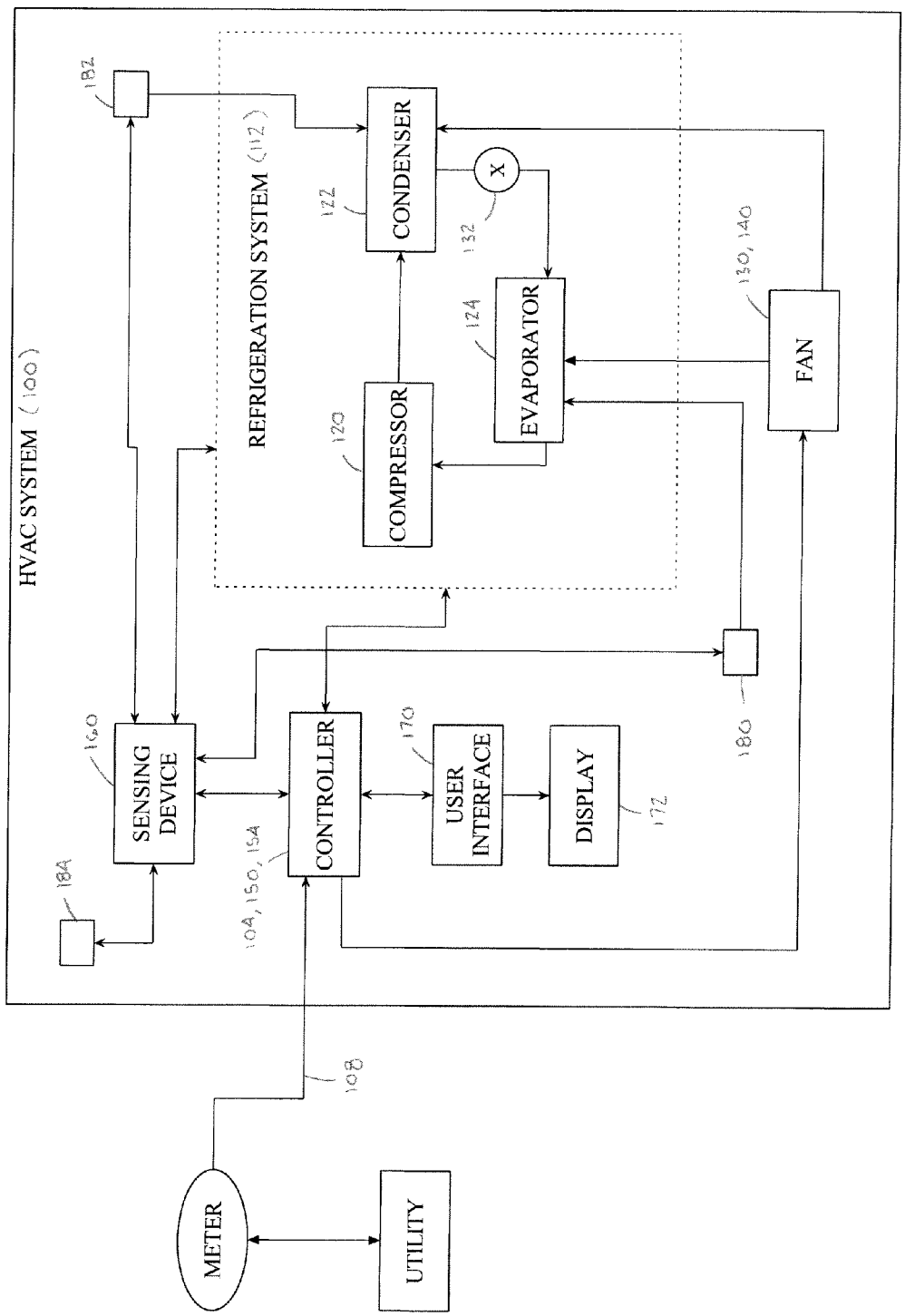
FIG. 1 is a schematic illustration of an exemplary demand managed HVAC system.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 schematically illustrates a HVAC system 100 for conditioning air of a room according to one aspect of the present disclosure. The HVAC system 100 comprises one or more power consuming features/functions including at least one temperature controlling element for one of heating and cooling air. A controller 104 is operatively connected to each of the power consuming features/functions. The controller 104 can include a micro computer on a printed circuit board which is programmed to selectively control the energization of the power consuming features/functions. The controller 104 is configured to receive and process a signal 108 indicative of a utility state, for example, availability and/or current cost of supplied energy. There are several ways to accomplish this communication, including but not limited to PLC (power line carrier, also known as power line communication), FM, AM SSB, WiFi, ZigBee, Radio Broadcast Data System, 802.11, 802.15.4, etc. The energy signal may be generated by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period.

The controller 104 can operate the HVAC system 100 in one of a plurality of operating modes, including a normal operating mode and an energy savings mode in response to the received signal. Specifically, the HVAC system 100 can be operated in the normal mode in response to a signal indicating an off-peak demand state or period and can be operated in an energy savings mode in response to a signal indicating a peak demand state or period. As will be discussed in greater detail below, the controller 104 is configured to selectively adjust and disable at least one of the one or more power consuming features/functions to reduce power consumption of the HVAC system 100 in the energy savings mode. It should be appreciated that the controller can be configured with default settings which govern normal mode and energy savings mode operation. Such settings in each mode can be fixed while others adjustable to user preference and to provide response to load shedding signals.

Figure 2:
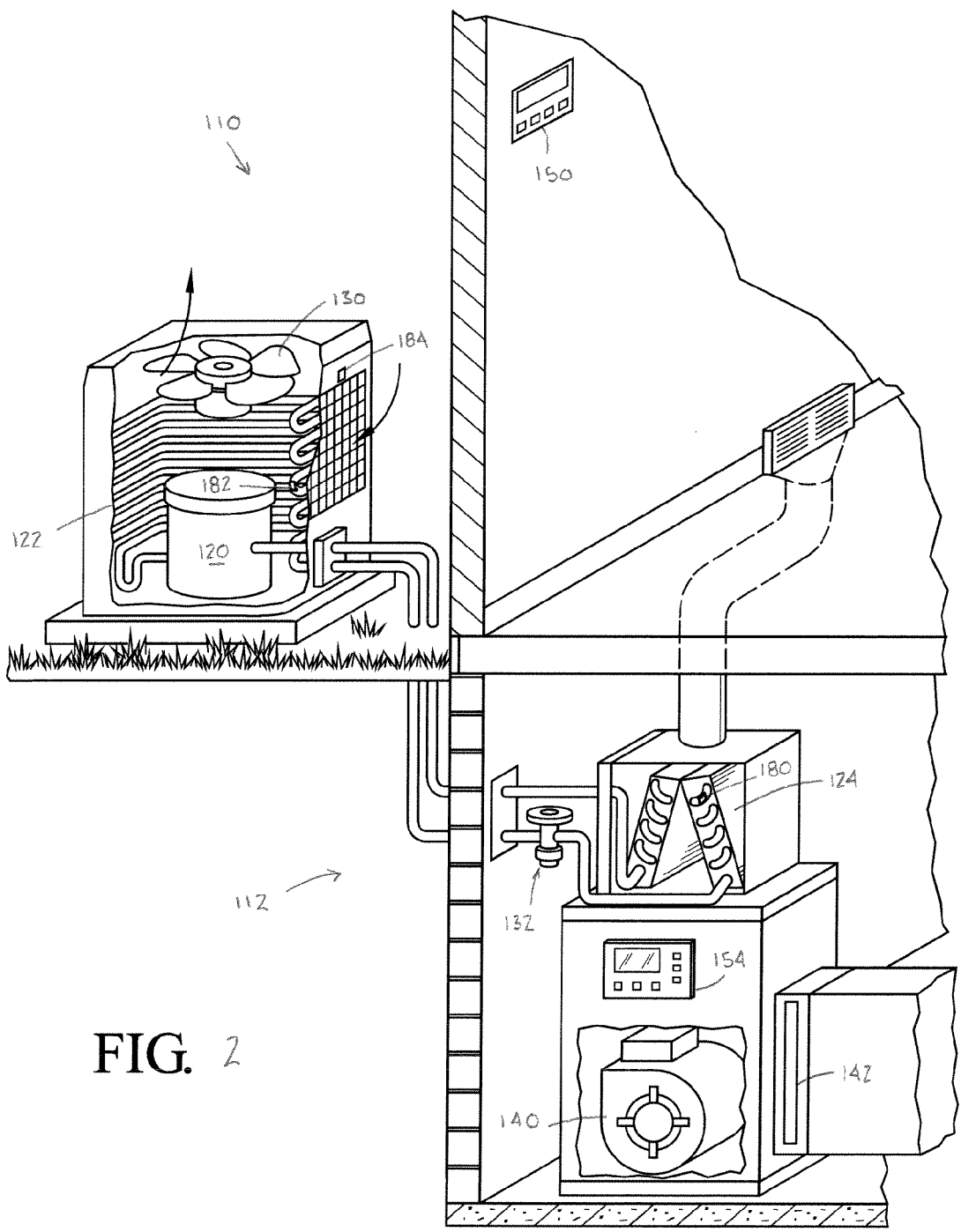
FIG. 2 is a schematic illustration of an exemplary demand managed central air conditioning system for a home.

An exemplary embodiment of the HVAC system 100 is illustrated in FIG. 2. In this embodiment, the HVAC system 100 is a central air conditioning system 110 and the at least one temperature controlling element is a refrigeration system 112 including a setpoint temperature. The refrigeration system is a closed loop system defining passages for a refrigerant fluid to flow and includes a compressor 120, a condenser 122 and an evaporator 124 in a refrigerant flow relationship. As is well known, the compressor 120, which can be driven by electrical energy or other suitable power sources, compresses a low-pressure refrigerant vapor exiting the evaporator 124 into a high pressure and temperature vapor. This high pressure vapor refrigerant rejects heat to outdoor ambient air in the condenser 122 condensing into a liquid. As depicted, the condenser can comprise one or more coils or tubes adapted to receive the hot refrigerant from the compressor. An outdoor fan 130 blows ambient air across the condenser. The liquid refrigerant then passes through an expansion device 132 such as a thermostatic expansion valve or a fixed orifice device and becomes a low pressure two-phase refrigerant. The expansion valve 132 can be located on a conduit which is in communication with the evaporator 124 to meter the flow of liquid refrigerant entering the evaporator at a rate that matches the amount of refrigerant being boiled off in the evaporator. This refrigerant then enters the indoor coils of the evaporator 124 and absorbs heat from the indoor air circulated by an indoor fan or blower 140. An air filter 142 is provided for filtering the air flowing through the blower and into the evaporator. Cool, dehumidified air is then blown through ductwork into rooms to be cooled. The evaporator 124 then discharges refrigerant to a conduit which is in communication with the compressor 120. The refrigerant vapor then enters the compressor 120 and the cycle repeats. In effect, indoor air is cooled by absorbing heat from indoor air and rejecting the heat to outdoor air in a vapor compression based air-conditioning system.

In a conventional system, a thermostat 150 typically controls the air conditioning system using dry bulb temperature alone. In the exemplary central air conditioning system 110, the thermostat 150 is one module of the controller 104 which controls the operation of the system 110. The controller 104 can also include a separate control module 154 which can be located on a blower housing; although, this is not required. As shown in FIG. 1, a sensing device 160 is operatively connected to the controller 104. According to one aspect, the sensing device is integrated with the controller 104; although, this is not required. The sensing device 160 has sensor inputs for indoor air dry-bulb temperature, indoor relative humidity, outdoor air temperature, outdoor relative humidity, supply air temperature and return air temperature. The output of the sensing device 160 is processed by the controller 104. The controller, in response to the sensing device output and depending on a setpoint temperature of the refrigeration system, selectively actuates the refrigeration system 112.

With reference again to FIG. 1, a control panel or user interface 170 is provided on the HVAC system 100 and is operatively connected to the controller 104. The control panel 170 can include a display 172 and control buttons for making various operational selections, such as setting the setpoint temperature of temperature controlling element. A light source can be provided for illuminating the user interface.

If the controller 104 receives and processes an energy signal indicative of a peak demand period at any time during operation of the HVAC system 100, the controller makes a determination of whether one or more of the power consuming features/functions should be operated in the energy savings mode and if so, it signals the appropriate features/functions of the HVAC system 100 to begin operating in the energy savings mode in order to reduce the instantaneous amount of energy being consumed by the HVAC system. The controller 104 determines what features/functions should be operated at a lower consumption level and what that lower consumption level should be, rather than an uncontrolled immediate termination of the operation of specific features/functions.

In order to reduce the peak energy consumed by the HVAC system 100, the controller 104 is configured to at least one of selectively adjust and disable at least one of the one or more above described power consuming features/functions to reduce power consumption of the HVAC system 100 in the energy savings mode. Reducing total energy consumed also encompasses reducing the energy consumed at peak times and/or reducing the overall electricity demands. Electricity demands can be defined as average watts over a short period of time, typically 5-60 minutes. Off peak demand periods correspond to periods during which lower cost energy is being supplied by the utility relative to peak demand periods. Operational adjustments that result in functional energy savings will be described in detail hereinafter.

As set forth above, the HVAC system 100 has a setpoint temperature in the normal operating mode. To reduce the power consumption of the HVAC system 100 in the energy savings mode, the controller 104 is configured to adjust (increase or decrease) the setpoint temperature of the HVAC system to precipitate less refrigeration system on time (i.e., compressor on time) in the energy savings mode. For example, if the HVAC system 100 is being used to cool the room air, the controller 104 can increase the setpoint temperature. If the HVAC system 100 includes a heat pump cycle to heat the room air, the controller 104 can decrease the setpoint temperature. To precipitate less compressor on time, according to one aspect, a duty cycle of the compressor 120 can be adjusted (for example, by time or by setpoint) in the energy savings mode. According to another aspect, to reduce the current draw of the compressor 120 in the energy savings mode, the speed and/or capacity of the compressor can be varied or reduced. A controllable expansion valve can also be implemented. According to yet another aspect, the refrigeration system 112 can be temporarily deactivated in the energy savings mode. In this instance, the fan 140 can continue to operate to limit discomfort to the consumer. The light source of the user interface 170 can also be dimmed or deactivated in the energy savings mode. The speed of the fan 130 and/or fan 140 can also be varied and/or reduced or the fan 130 and/or fan 140 can be deactivated in the energy savings mode.

Other power load reducing measures may include reducing before on-peak hours the setpoint temperature (pre-chilling) and increasing the setpoint temperature during on-peak rates. For example, shortly before peak rate time, the temperature setting of the central air conditioning system 110 could be decreased by 1-2 degrees (during off-peak rates). One skilled in the art of heat transfer will appreciate that this pre-chilling maneuver would need to occur a predetermined time prior to the peak demand period to allow enough time for the environs to reach the pre-chilled setpoint temperature. The system could "learn" the amount of time required for a given pre-chill at a specific ambient condition and then invoke the pre-chill accordingly. Some communication line with the utility including but not limited to the communication arrangements hereinbefore described could be established so that the utility can send a signal in advance to decrease the room temperature during off-peak rates as a pre-chill maneuver and, in turn, increase the setpoint temperature during on-peak rates.

The determination of which power consuming features/functions are operated in a energy savings mode may depend on whether the HVAC system 100 is currently operating in the cooling cycle or the heating cycle. In one embodiment, the controller 104 may include functionality to determine whether activation of the energy savings mode for any power consuming features/functions would potentially cause damage to any feature/function of the HVAC system 100 itself or would cause the HVAC system to fail to perform its intended function. If the controller 104 determines that an unacceptable consequence may occur by performing an energy saving action, such as deactivating or curtailing the operation of the refrigeration system 112, the controller may opt-out of performing that specific energy saving action or may institute or extend other procedures.

Further, the controller 104 can be configured to monitor various parameters of the refrigeration system 112 as well as the home environs and alert a user of a fault condition of the HVAC system 100. For example, the controller can be configured to monitor or extrapolate faults of at least one of the capacity of the compressor 120, refrigerant charge level and air filter system and alert a user of a respective low capacity, low charge level and severely clogged air filter system. To this end, and as shown in FIGS. 1 and 2, the sensing device 160 can include a first sensing device 180, a second sensing device 182 and a third sensing device 184. The first sensing device 180 measures a temperature of the evaporator 124. The second sensing device 182 measures a temperature of the condenser 122. The third sensing device 184 measures outside ambient temperature. The thermostat of the HVAC system 100 is set to an indoor setpoint temperature by the user and senses the actual indoor ambient temperature. The controller 104 is configured to record the respective evaporator, condenser and outdoor ambient temperatures along with run times of the compressor 120 during operation of the HVAC system 100. The controller 104 can then utilize the recorded temperatures and run times to identify a fault condition. The controller can be configured to compare the run times associated with an outdoor ambient temperature and setpoint or actual room temperature to identify a fault condition (see FIG. 4).

Figure 4:
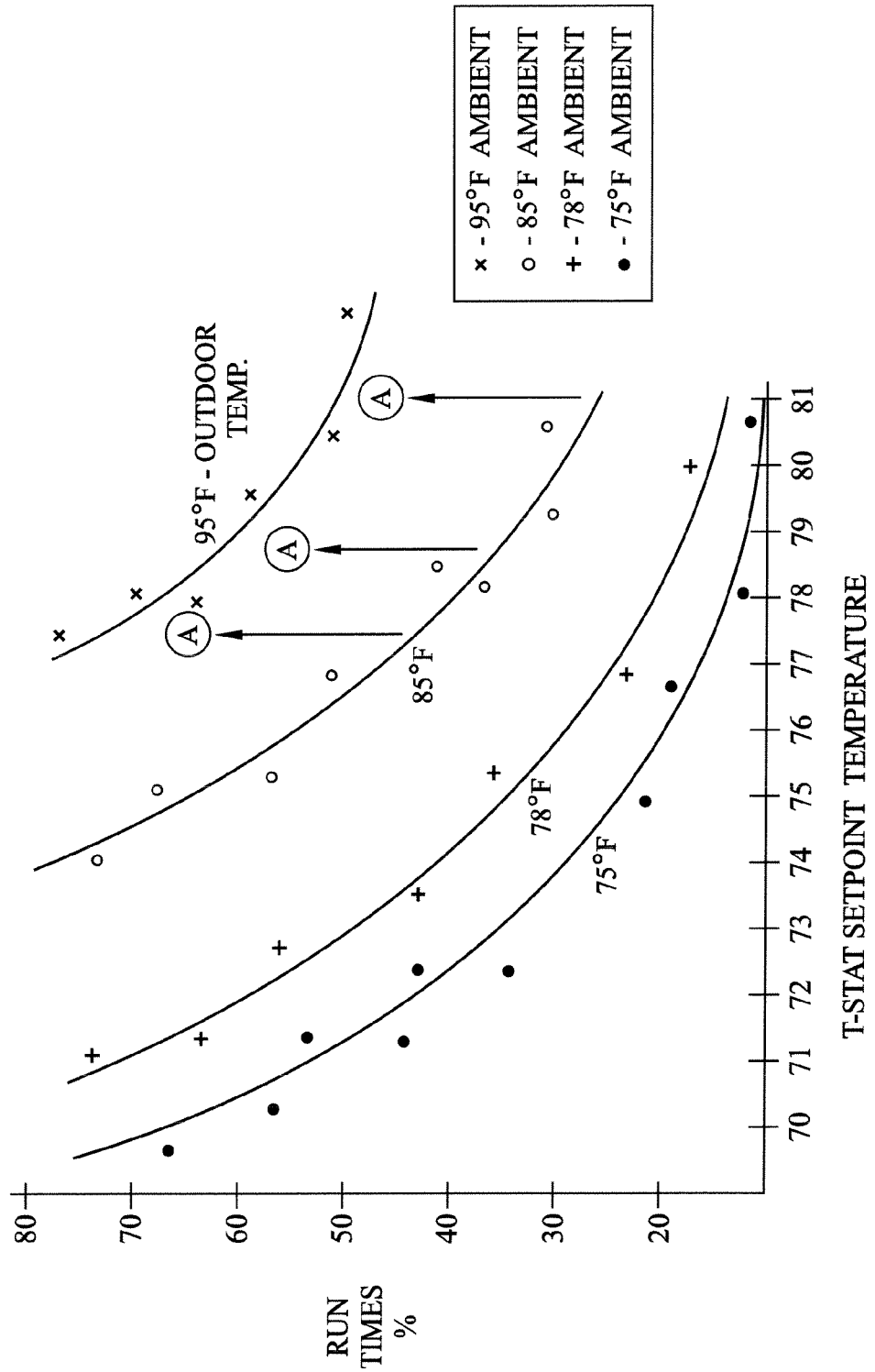
FIGS. 4-7 are exemplary diagnostics for the HVAC system of FIG. 1 for detecting a fault condition of the HVAC system.

By way of example only, and with reference to FIG. 4, the controller 104 creates a "map" of run times for a given thermostat setpoint temperature ("t-stat") and outdoor ambient temperature. An "original" map is stored by the controller 104 when the system in newly installed or functioning properly. "Current maps" are derived for a predetermined finite timeframe (running average) and compared with the "original" map. The controller 104 can flag fault conditions, such as the exemplary fault conditions "A" shown in FIG. 4. Fault conditions "A" depict increased run times for 85 degrees ambient temperature and indicate a loss of capacity in the HVAC system 100 and/or increased heat leakage of the home or building. Loss of capacity can be indicative of low charge, a severely clogged air filter, a blocked condenser, failed components, etc. As shown in FIG. 4, there will be some "scatter" in the mapped data due to variances in internal house/building loads, fenestration, door openings, and the like. The controller 104 is configured to identify "scatter" outside of a normal amount, such as looking for a "drift" as shown by fault conditions "A". It should be appreciated that the controller 104 can use evaporator temperatures and condenser temperatures instead of thermostat setpoint temperatures and outdoor ambient temperatures and build a similar map to diagnose the HVAC system 100. It should be appreciated to one skilled in the art that this "map" will have less scatter in data points. The degradation in performance between a clogged filter and a new filter could be "taught" to the controller 104 as new filters are installed and performance as "baselined". The controller could then alert the user when the filter needed changing. Any significant performance degradation beyond this point would be flagged as a system issue.

Figure 5:
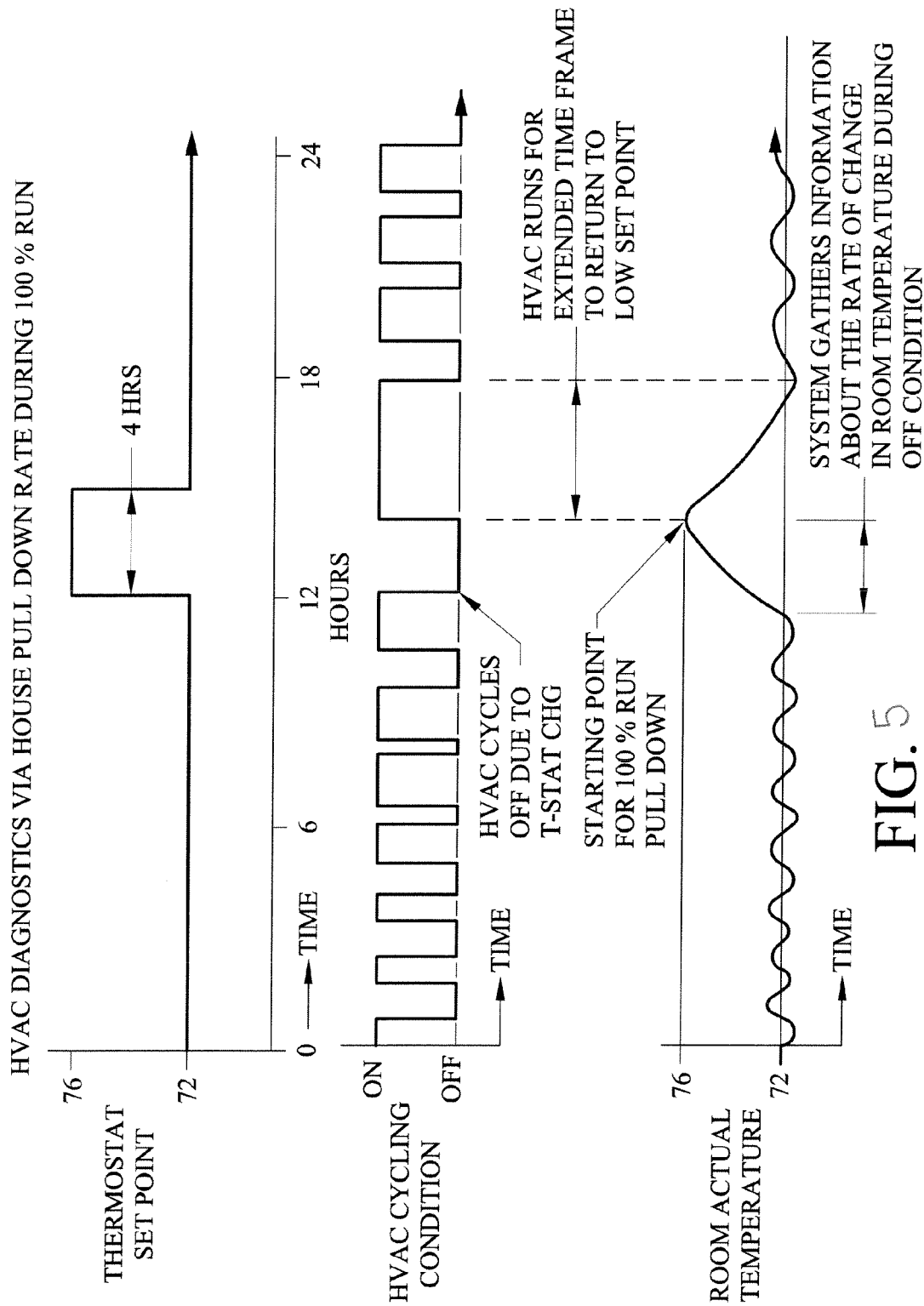
Figure 6:
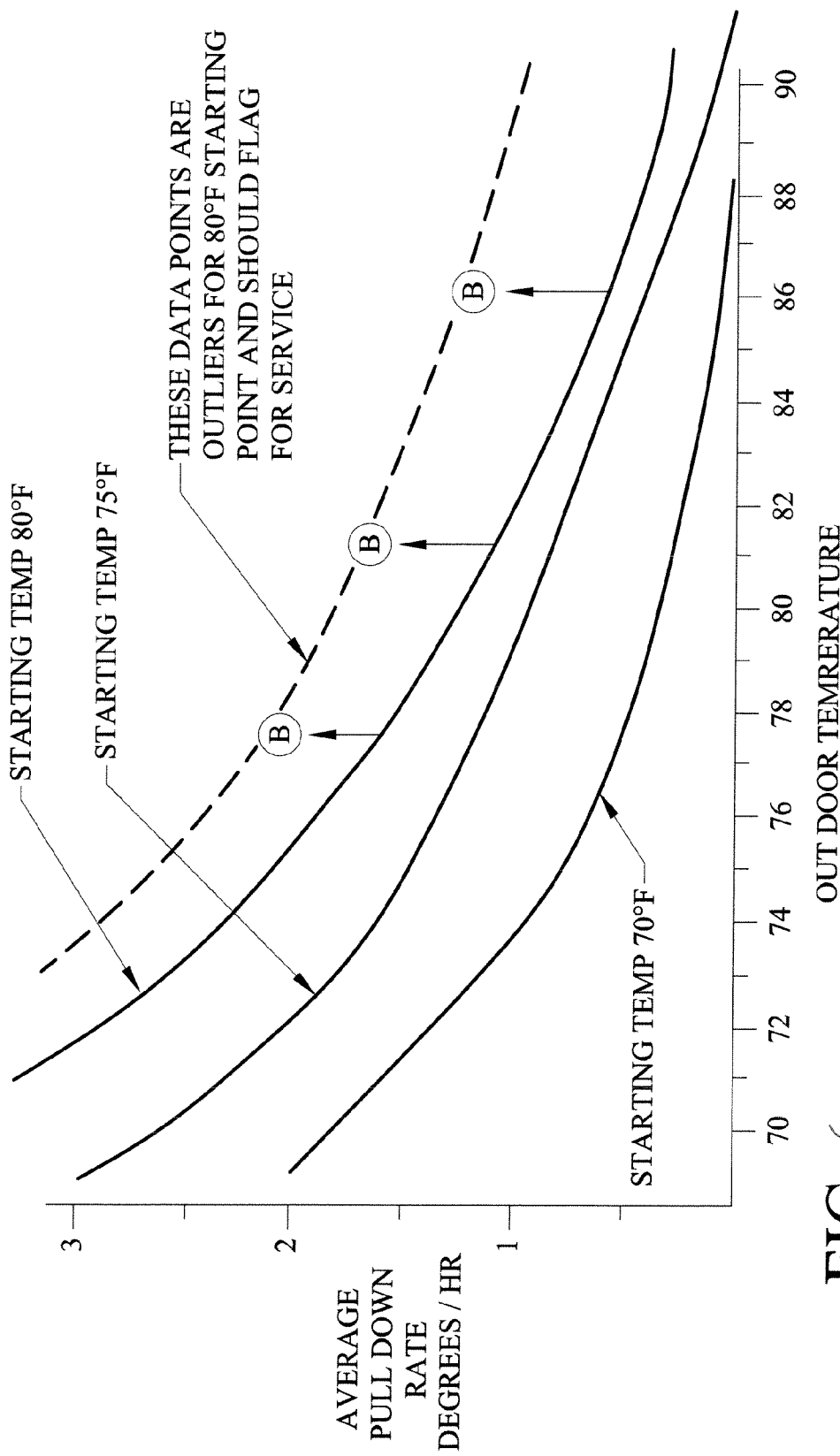

With reference to FIGS. 5 and 6, the controller 104 can also record the outdoor ambient temperature at predetermined time intervals along with run times of the compressor during operation of the HVAC system 100 and then compare the room temperature rate of change during the run times to identify a fault condition. Particularly, the controller 104 can record the average room temperature rate of change during 100% run times of the HVAC system (compressor) during the house recovery period (temperature return to lower setpoint) after a demand response event to identify a fault condition. The controller 104 will compare the rate of change with historical data taken when the system was new or functioning properly to identify anomalies indicative of a fault condition. By way of example only, and as shown in FIG. 6, the controller 104 develops "maps" of average pulldown rates following a demand response event. The "maps" are accumulated and stored when the HVAC system 100 is first installed. The controller 104 then develops "current maps" for a predetermined timeframe to compare with the stored historical maps. The controller can identify fault conditions, such as the exemplary fault conditions "B" shown in FIG. 6. If this data set were recorded for a pulldown starting at 80 degrees as compared to the original curve, then the HVAC system 100 can have a capacity issue more than likely caused by a low charge, a severely clogged filter, a blocked condenser and/or other failed components of the HVAC system 100. It should be appreciated that a low charge and failed components can be differentiated from a clogged filter by the amount of shift in the curve.

Figure 7:
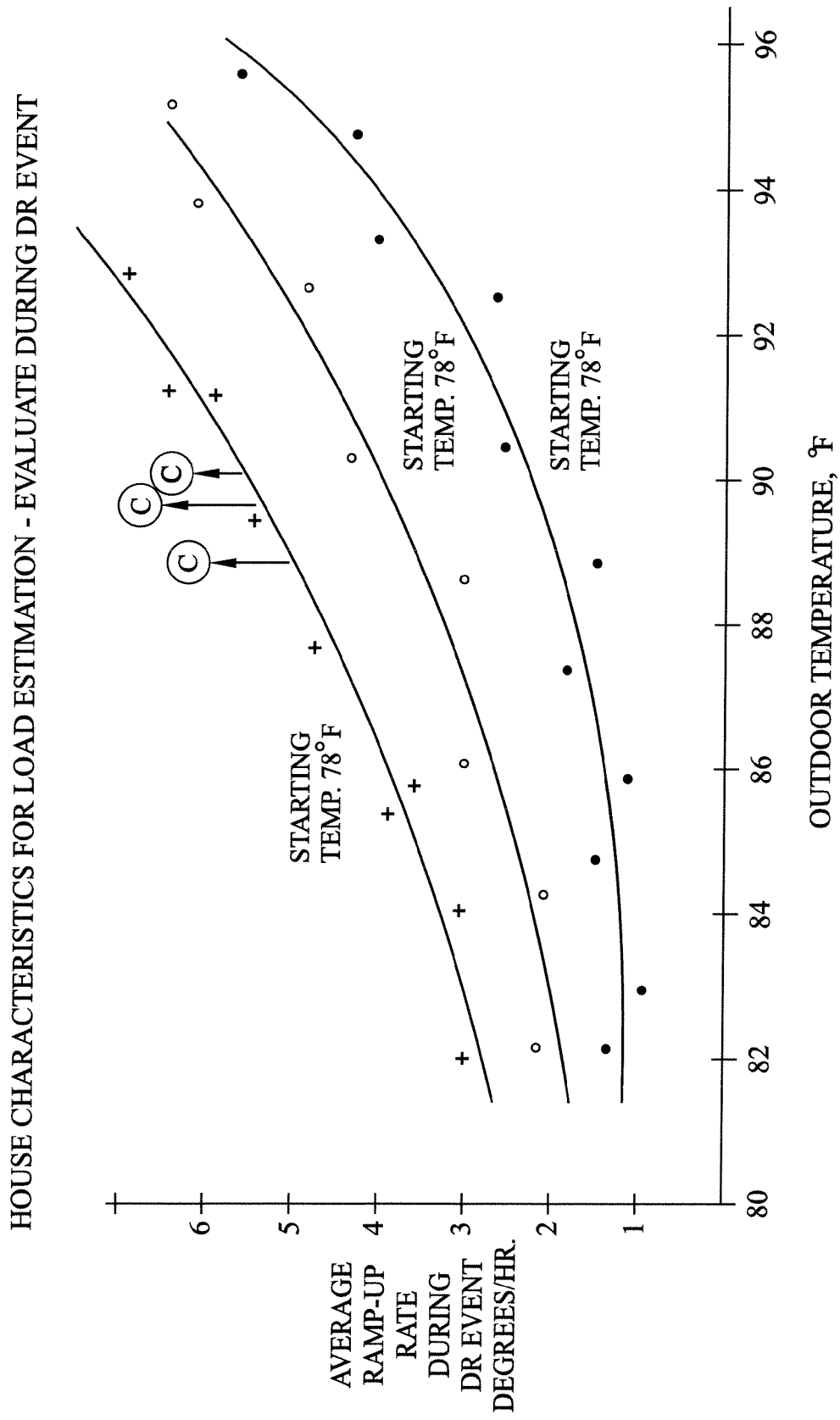

Further, with reference to FIG. 7, the controller 104 can be configured to develop a mapping routine that will characterize the thermal efficiency of the house and/or building. To this end, the controller 104 will gather and store data regarding the indoor temperature and outdoor temperature coincident with the "rate of change of the indoor temperature versus time" during the off-cycle of the HVAC system 100 (the off cycle can be precipitated by a demand response event). The controller 104 will then compare the rate of change (ramp up temperature versus time) for a singular or a series of days with a stored "historical" value established over a specific timeframe and indoor/outdoor coordinate. By this comparison, the controller can identify and flag anomalies driven by thermal degradation in windows, insulation, air leaks, doors, etc. By way of example only, and as shown in FIG. 7, the controller 104 develops "maps" of average ramp-up rate of the home during the demand response event. The "maps" are accumulated and stored when the HVAC system 100 is first installed. Data points for future demand response events are compared to the stored "maps" to identify fault conditions (such as the exemplary fault conditions "C" for a starting temperature of 70 degrees) of degradation in the home (window degradation, leaky seals, insulation degradation, etc.). There will be some "scatter" in the data points based on fenestration loading. To account for this, the controller 104 is configured to generate dual sets of maps for sunny and cloudy days.

It should also be appreciated that the controller 104 can be configured to monitor and store outdoor ambient temperatures, past run times for a given ambient temperature and associated costs for maintaining a first setpoint temperature and estimate a future cost for maintaining the first setpoint temperature. The controller can then estimate a future cost for maintaining the first setpoint temperature and/or estimate a future cost for a second setpoint temperature at a given outdoor ambient temperature. This allows the controller to look forward in time to maintain a temperature at 72 degrees, for example, and estimate cost going forward by looking at outdoor ambient temperatures (weather conditions) and/or past run times. This cost estimate can be viewed at different time periods such as day/week/month for example. Different time periods will allow users to estimate immediate and long term cost impacts. By looking at the past run times and associated costs, a user can predict and/or calculate future costs for a specified setpoint temperature, for example increasing the setpoint temperature to 74 degrees. In order to predict future costs, the controller 104 could acquire data regarding future weather conditions (for example from the Internet or other means). It would then lookup the energy usage or "cost to operate" the HVAC system 100 for the proposed indoor setpoint temperatures from the "previously stored maps" With this data, it could make comparisons and allow the user to select setpoint temperatures based on energy, utility costs, CO2 emissions, or any other metric previously stored in the "map" for a given condition. It could sum the costs for multiple days and provide the user information about how much they would save or spend based on alternate setpoint temperatures the user might choose. If no weather data is available prior energy consumption will be used to predict the new set point cost estimates.

Figure 3:
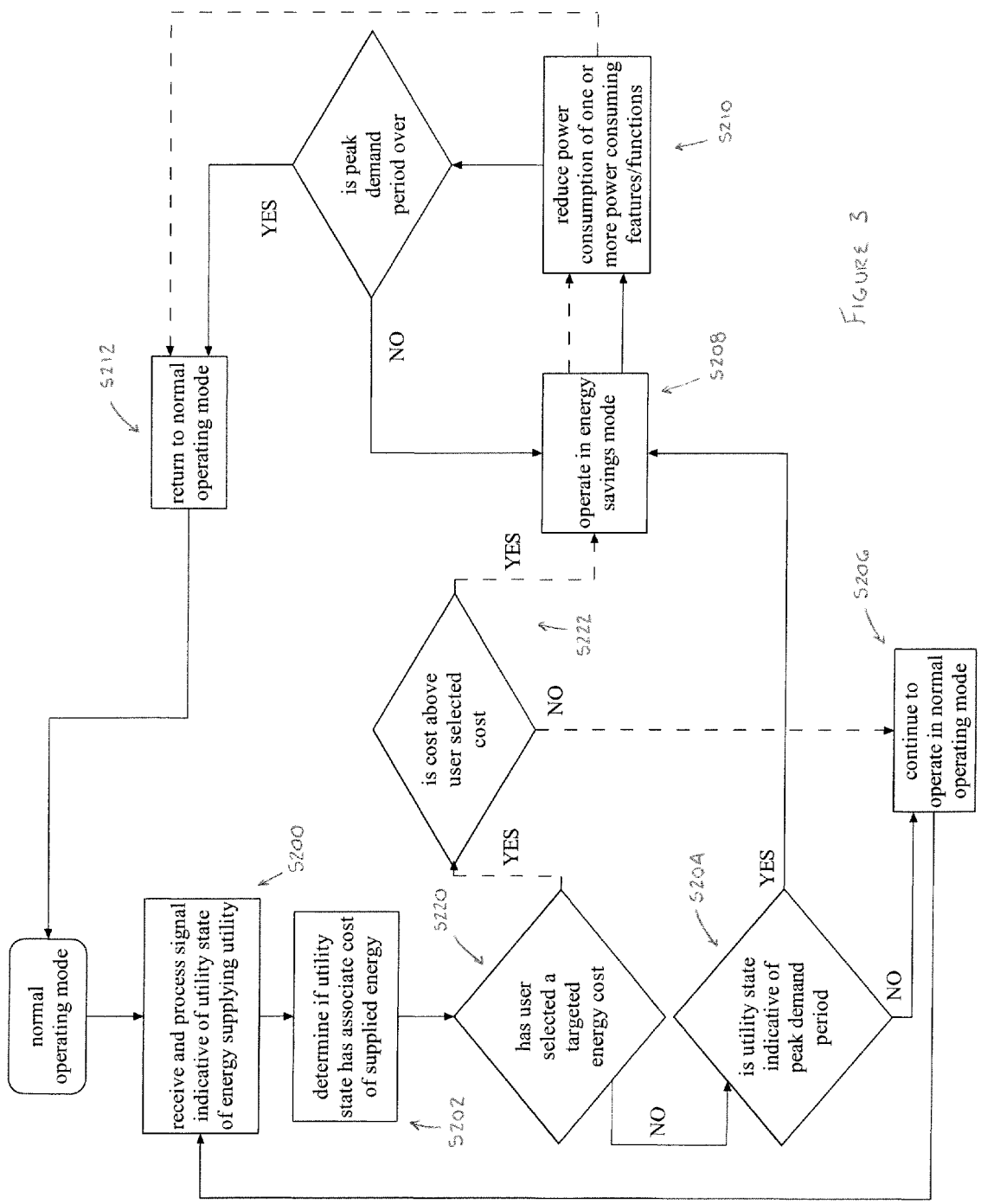
FIG. 3 is an exemplary operational flow chart for the central air conditioning of FIG. 2.

With reference to FIG. 3, a control method for the HVAC system 100, such as the depicted central air conditioning system 110, in accordance with one aspect of the present disclosure comprises receiving and processing the signal indicative of cost of supplied energy (S200); determining a state for an associated energy supplying utility, such as a cost of supplying energy from the associated utility (S202); determining if the utility state is indicative a peak demand period or an off-peak demand period (S204); operating the system in a normal mode during the off-peak demand period (S206); operating the system in an energy savings during the peak demand period (S208); selectively adjusting and/or deactivating any number of one or more power consuming features/functions of the system to reduce power consumption of the system in the energy savings mode (S210); and returning to the normal mode after the peak demand period is over (S212). For the central air conditioning system 110, the control method can comprise adjusting a setpoint temperature to precipitate less refrigeration system on time in the energy savings mode. The control method can further comprise adjusting a duty cycle or variable speed of the compressor 120 and/or deactivating the refrigeration system 112 altogether.

As indicated previously, the control panel or user interface 170 can include a display and control buttons for making various operational selections. The display can be configured to provide active, real-time feedback to the user on the cost of operating the HVAC system 100. The costs associated with using the HVAC system 100 are generally based on the current operating and usage patterns and energy consumption costs, such as the cost per kilowatt hour charged by the corresponding utility. The controller 104 is configured to gather information and data related to current usage patterns and as well as current power costs. This information can be used to determine current energy usage and cost associated with using the HVAC system 100 in one of the energy savings mode and normal mode. This real-time information (i.e., current usage patterns, current power cost and current energy usage/cost) can be presented to the user via the display.

It is to be appreciated that a manual or selectable override can be provided on the user interface 170 providing a user the ability to select which of the one or more power consuming features/functions are delayed, adjusted and/or disabled by the controller in the energy savings mode. The user can override any adjustments, whether time related or function related, to any of the power consuming functions. Further, the user can override the current operating mode of the HVAC system 100. Particularly, as shown in FIG. 3, if the utility state has an associated energy cost, the user can base operation of the HVAC system on a user selected targeted energy cost, such a selected pricing tier or cost per kilowatt hour charged by the corresponding utility (S220). If the current cost exceeds the user selected cost, the controller 104 will operate the HVAC system 100 in the energy savings mode (S222, S208 and S210). If the current cost is less than the user selected cost, the controller 104 will operate the HVAC system 100 in the normal mode (S206). This operation based on a user selected targeted energy cost is regardless of the current energy cost being indicative of one of a peak demand period and an off-peak demand period.

The control method for the HVAC system 100 can further identify a fault condition of the system. Particularly, according to one exemplary embodiment, the control method comprises measuring ambient temperature during a duty cycle of the refrigeration system; maintaining a historical database of the duty cycles associated with a given ambient temperature and the setpoint temperature; and identifying a fault condition of the refrigeration system upon the detection of a duty cycle inconsistent with norms based upon the established historical database. Additionally, the control method can comprise measuring evaporator and condenser temperatures during a duty cycle of the refrigeration system and maintaining a historical database of the duty cycles associated with a given evaporator temperature and a given condenser temperature and identifying a fault condition upon the detection of temperatures inconsistent with norms based upon the established historical database.

The operational adjustments, particularly an energy savings operation can be accompanied by a display on the control panel which communicates activation of the energy savings mode. The energy savings mode display can include a display of "ECO", "Eco", "EP", "ER", "CP", "CPP", "DR", or "PP" on the HVAC system display panel in cases where the display is limited to three characters. In cases with displays having additional characters available, messaging can be enhanced accordingly. Additionally, an audible signal can be provided to alert the user of the HVAC system operating in the energy savings mode.

The duration of time that the HVAC system 100 operates in the energy savings mode may be determined by information in the energy signal. For example, the energy signal may inform the controller 104 to operate in the energy savings mode for a few minutes or for one hour, at which time the HVAC system 100 returns to normal operation. Alternatively, the energy signal may be continuously transmitted by the utility provider, or other signal generating system, as long as it is determined that instantaneous load reduction is necessary. Once transmission of the signal has ceased, the HVAC system 100 returns to normal operating mode. In yet another embodiment, an energy signal may be transmitted to the controller 104 to signal the HVAC system 100 to operate in the energy savings mode. A normal operation signal may then be later transmitted to the controller 104 to signal the HVAC system to return to the normal operating mode.

The operation of the HVAC system 100 may vary as a function of a characteristic of the utility state and/or supplied energy, e.g., availability and/or price. Because some energy suppliers offer what is known as time-of-use pricing in their tariffs, price points could be tied directly to the tariff structure for the energy supplier. If real time pricing is offered by the energy supplier serving the site, this variance could be utilized to generate savings and reduce chain demand. Another load management program offered by energy supplier utilizes price tiers which the utility manages dynamically to reflect the total cost of energy delivery to its customers. These tiers provide the customer a relative indicator of the price of energy and are usually defined as being LOW, MEDIUM, HIGH and CRITICAL. The controller 104 is configured to operate the HVAC system in an operating mode corresponding to one of the price tiers. For example, the controller is configured to operate the HVAC system 100 in the normal operating mode during each of the low and medium price tier and is configured to operate the HVAC system in the energy savings mode during each of the high and critical price tier. If the utility offers more than two rate/cost conditions, different combinations of energy saving control steps may be programmed to provide satisfactory cost savings/performance tradeoff.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An HVAC system for conditioning air of an associated room comprising:
   one or more power consuming features/functions including at least one temperature controlling element for one of heating and cooling air; and
   a controller operatively connected to the one or more power consuming features/functions, the controller being configured to receive and process a signal indicative of a utility state, the controller operating the HVAC system in one of a plurality or operating modes, including at least a normal operating mode and an energy sayings mode in response to the received signal, the controller being configured to at least one of selectively adjust and deactivate at least one of the one or more power consuming features/functions to reduce power consumption of the HVAC system in the energy savings mode, the controller is configured to monitor the power consuming features/functions and alert a user of a fault condition for the HVAC system,
   wherein the at least one temperature controlling element is a refrigeration system, the refrigeration system including a setpoint temperature, the controller is configured to adjust the setpoint temperature to precipitate less refrigeration system on time in the energy savings mode,
   wherein the refrigeration system includes a compressor, a condenser and an evaporator in a refrigerant flow relationship, the controller being configured to one of adjust a duty cycle of, reduce the speed of and reduce the capacity of the compressor in the energy savings mode, and
   wherein the controller is configured to monitor at least one of the capacity of the compressor and refrigerant charge level and alert a user of the fault condition for the HVAC system, the fault condition including at least a low capacity and a low charge level.

2. The HVAC system of claim 1, further including a first sensing device for measuring a temperature of the evaporator, a second sensing device for measuring a temperature of the condenser and a third sensing device for measuring ambient temperature, wherein the controller is configured to record the respective evaporator, condenser and ambient temperatures along with run times of the compressor during operation of the HVAC system, the controller being configured to utilize the recorded temperatures and run times to identify a fault condition.

3. The HVAC system of claim 1, further including a sensing device for measuring ambient temperature, wherein the controller is configured to record the ambient temperatures along with run times of the compressor during operation of the HVAC system, the controller being configured to compare the run times associated with an ambient temperature and setpoint temperature to identify a fault condition.

4. The HVAC system of claim 1, further including a sensing device for measuring ambient temperature, wherein the controller is configured to record the ambient temperature at predetermined time intervals along with run times of the compressor during operation of the HVAC system, the controller being configured to compare the room temperature rate of change during the run times to identify a fault condition.

5. An HVAC system, comprising:
   one or more power consuming features/functions including at least one temperature controlling element for one of heating and cooling air; and
   a controller operatively connected to the one or more power consuming features/functions, the controller being configured to receive and process a signal indicative of a utility state, the controller operating the HVAC system in one of a plurality or operating modes, including at least a normal operating mode and an energy savings mode in response to the received signal, the controller being configured to at least one of selectively adjust and deactivate at least one of the one or more power consuming features/functions to reduce power consumption of the HVAC system in the energy savings mode, the controller is configured to monitor the power consuming features/functions and alert a user of a fault condition for the HVAC system, wherein the utility state has an associated energy cost and wherein the controller is configured to override the operating mode of the HVAC system based on a user selected targeted energy cost, wherein if current energy cost exceeds the user selected cost, the controller operates the HVAC system in the energy savings mode, and wherein if the current energy cost is less than the user selected cost, the controller operates the HVAC system in the normal operating mode.

6. The HVAC system of claim 5, wherein the controller is configured to deactivate the refrigeration system in the energy savings mode.

7. The HVAC system of claim 5, wherein the refrigeration system includes a compressor, a condenser and an evaporator in a refrigerant flow relationship, the controller being configured to one of adjust a duty cycle of, reduce the speed of and reduce the capacity of the compressor in the energy savings mode.

8. The HVAC system of claim 5, wherein the utility state signal is indicative of a price tier of the supplied energy, the controller being configured to operate the HVAC system in an operating mode corresponding to the price tier.

9. The HVAC system of claim 5, further including a user interface operatively connected to the controller, the user interface including a selectable override option providing a user the ability to select which of the one or more power consuming features/functions are adjusted and/or disabled by the controller in the energy savings mode, the user interface further including a display communicating activation of the energy savings mode.

10. The HVAC system of claim 5, wherein the utility state signal is indicative of the cost of the energy provided when in that state, the HVAC system further including a display indicative of current cost of energy and current cost of operating the HVAC system.

11. A central air conditioning system control method, comprising:
    determining a state for an associated energy supplying utility, the utility state being indicative of at least a peak demand period or an off-peak demand period;
    operating the central air conditioning system in a normal mode during the off-peak demand period;
    operating the central air conditioning system in an energy savings mode during the peak demand period;
    measuring ambient temperature during a duty cycle of the refrigeration system;
    maintaining a historical database of the duty cycles associated with a given ambient temperature and the setpoint temperature;
    identifying a fault condition of the refrigeration system based on the historical database;
    selectively adjusting and/or deactivating any number of one or more power consuming features/functions of the central air conditioning system to reduce power consumption of the central air conditioning system in the energy savings mode, including adjusting a setpoint temperature to precipitate less refrigeration system on time in the energy savings mode; and
    returning to the normal mode after the peak demand period is over.

12. The method of claim 11, further comprising adjusting one of the duty cycle and speed of a compressor of the refrigeration system in the energy savings mode.

13. The method of claim 11, further comprising deactivating the refrigeration system in the energy savings mode.

14. The method of claim 11, further comprising measuring evaporator and condenser temperatures during a duty cycle of the refrigeration system and maintaining a historical database of the duty cycles associated with a given evaporator temperature and a given condenser temperature.

15. The method of claim 11, further comprising:
    determining the energy cost associated with the utility demand;
    displaying current cost of operating the central air conditioning system,
    displaying current cost of supplied energy, and
    alerting a user of a peak demand period.

16. A central air conditioning system, comprising:
    a refrigeration system including a compressor, a condenser and an evaporator in a refrigerant flow relationship: and
    a controller configured to receive and process an energy signal, the signal having a first state indicative of a utility peak demand period and a second state indicative of a utility off-peak demand period, the controller operating the central air conditioning system in one of an energy savings mode and a normal operating mode based on the received signal being in the first and second states respectively,
    wherein the controller is configured to increase a setpoint temperature of the refrigeration system and adjust a duty of the compressor to precipitate less compressor on time in the energy savings mode unless the controller determines that an unacceptable consequence may occur as a result such adjustments
    wherein the controller is configured to monitor at least one of the capacity of the compressor and refrigerant charge level and alert a user of a fault condition for the refrigeration system, the fault condition including at least a low capacity and a low charge level.

17. The central air conditioning system of claim 16, further including a condenser fan for circulating outdoor air over the condenser and a blower for circulating indoor air over the evaporator, wherein the controller is configured to deactivate the refrigeration system and reduce speed of one of the condenser fan and blower in the energy savings mode.

18. The central air conditioning system of claim 16, wherein the controller is configured to reduce before peak demand period the setpoint temperature to pre-chill an associated room to a temperature lower than the setpoint temperature and increase the setpoint temperature during peak demand period.

19. A central air conditioning system, comprising:
    a refrigeration system including a compressor, a condenser and an evaporator in a refrigerant flow relationship; and
    a controller configured to receive and process an energy signal, the signal having a first state indicative of a utility peak demand period and a second state indicative of a utility off-peak demand period, the controller operating the central air conditioning system in one of an energy savings mode and a normal operating mode based on the received signal being in the first and second states respectively,
    wherein the controller is configured to increase a setpoint temperature of the refrigeration system and adjust a duty of the compressor to precipitate less compressor on time in the energy savings mode unless the controller determines that an unacceptable consequence may occur as a result such adjustments,
    wherein the controller is configured to monitor ramp-up rates during the peak demand period to identify degradation in an associated building.

20. A central air conditioning system, comprising:
a refrigeration system including a compressor, a condenser and an evaporator in a refrigerant flow relationship; and
a controller configured to receive and process an energy signal, the signal having a first state indicative of a utility peak demand period and a second state indicative of a utility off-peak demand period, the controller operating the central air conditioning system in one of an energy savings mode and a normal operating mode based on the received signal being in the first and second states respectively,
wherein the controller is configured to increase a setpoint temperature of the refrigeration system and adjust a duty of the compressor to precipitate less compressor on time in the energy savings mode unless the controller determines that an unacceptable consequence may occur as a result such adjustments
wherein the controller is configured to monitor and store outdoor ambient temperatures, past run times and associated costs for maintaining a first setpoint temperature and estimate a future cost for maintaining the first setpoint temperature and estimate a future cost for a second setpoint temperature at a given outdoor ambient temperature.

* * * * *

UNITED STATES PATENT AND TRADEMARK OFFICE
CERTIFICATE OF CORRECTION

| | | |
|---|---|---|
| PATENT NO. | : 8,280,556 B2 | Page 1 of 1 |
| APPLICATION NO. | : 12/644556 | |
| DATED | : October 2, 2012 | |
| INVENTOR(S) | : Besore et al. | |

It is certified that error appears in the above-identified patent and that said Letters Patent is hereby corrected as shown below:

In the Drawings:

In Fig. 6, Sheet 6 of 7, delete "TEMRERATURE" and insert -- TEMPERATURE --, therefor.

In the Claims:

In Column 9, Line 58, in Claim 1, delete "room" and insert -- room, --, therefor.

In Column 9, Line 67, in Claim 1, delete "sayings" and insert -- savings --, therefor.

In Column 12, Line 16, in Claim 16, delete "relationship:" and insert -- relationship; --, therefor.

In Column 12, Line 30, in Claim 16, delete "adjustments" and insert -- adjustments, --, therefor.

In Column 14, Line 4, in Claim 20, delete "adjustments" and insert -- adjustments, --, therefor.

Signed and Sealed this
Fourteenth Day of May, 2013

Teresa Stanek Rea
*Acting Director of the United States Patent and Trademark Office*